(12) United States Patent
Balakrishnan et al.

(10) Patent No.: US 12,025,994 B2
(45) Date of Patent: Jul. 2, 2024

(54) REJECTED TAKEOFF AIRCRAFT SYSTEM AND METHOD

(71) Applicant: Rockwell Collins, Inc., Cedar Rapids, IA (US)

(72) Inventors: Rajaram Balakrishnan, Kanchipuram (IN); Sridhar Hariram, Bangalor (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 230 days.

(21) Appl. No.: 17/359,852

(22) Filed: Jun. 28, 2021

(65) Prior Publication Data

US 2022/0197313 A1    Jun. 23, 2022

(30) Foreign Application Priority Data

Dec. 23, 2020   (IN) .............................. 202041056065

(51) Int. Cl.
   *B64D 45/00*     (2006.01)
   *B64D 43/00*     (2006.01)
   (Continued)

(52) U.S. Cl.
   CPC ............. *G05D 1/106* (2019.05); *B64D 43/00* (2013.01); *B64D 45/00* (2013.01); *G08B 7/06* (2013.01)

(58) Field of Classification Search
   CPC ...... G05D 1/106; G05D 1/0661; B64D 43/00; B64D 45/00; G08B 7/06; B60T 2210/12;
   (Continued)

(56) References Cited

U.S. PATENT DOCUMENTS 3,920,204 A  *  11/1975  Bissell ................. G05D 1/0083
                                                           701/70
4,034,938 A      7/1977  Borelan et al.
(Continued)

FOREIGN PATENT DOCUMENTS

EP          2873573 A1  *  5/2015  ............ B60T 8/1703
WO       2018117872 A1      6/2018

OTHER PUBLICATIONS

Extended Search Report for International Application No. 21217344.7 dated May 11, 2022, 9 pages.

*Primary Examiner* — Hunter B Lonsberry
*Assistant Examiner* — Robert Louis Pinkerton
(74) *Attorney, Agent, or Firm* — Suiter Swantz IP (57) ABSTRACT

A system may include a processor installed in an aircraft. The processor may be configured to: obtain runway friction coefficient data and runway surface condition data for a runway; obtain braking coefficient data and braking action index data; obtain equivalent runway condition data and runway length data for the runway; obtain aircraft speed data of the aircraft and aircraft configuration data; based at least on the runway friction coefficient data, the runway surface condition data, the braking coefficient data, the braking action index data, the equivalent runway condition data, the aircraft speed data, and the aircraft configuration data, determine a rejected takeoff (RTO) initiating point (RIP) and a start automated RTO sequence point; and cause an automated RTO sequence to be performed if the start automated RTO sequence point is reached without the automated RTO sequence being manually overridden.

6 Claims, 7 Drawing Sheets

(51) Int. Cl.
*G05D 1/00* (2024.01)
*G08B 7/06* (2006.01)

(58) Field of Classification Search
CPC .......... B60T 7/12; B60T 8/1703; B60T 8/172; B60T 8/325; B64C 25/426; B64C 13/16
USPC .......................................................... 701/15
See application file for complete search history.

(56) References Cited

U.S. PATENT DOCUMENTS

| | | | | |
|---|---|---|---|---|
| 5,142,478 | A | | 8/1992 | Crook |
| 5,353,022 | A * | 10/1994 | Middleton | ............. G08G 5/025 701/15 |
| 5,499,025 | A * | 3/1996 | Middleton | ............. G08G 5/025 701/16 |
| 5,539,642 | A * | 7/1996 | Wiel | ........................ B60T 8/174 706/900 |
| 5,845,975 | A * | 12/1998 | Wells | ...................... B64C 25/42 244/110 A |
| 7,720,579 | B2 | 5/2010 | Goodman et al. | |
| 9,164,505 | B1 * | 10/2015 | Peck | ........................ B60T 8/885 |
| 10,202,204 | B1 * | 2/2019 | Daidzic | ...................... B64C 5/02 |
| 10,429,856 | B2 * | 10/2019 | Guedes | ................ G05D 1/0083 |
| 2008/0154445 | A1 * | 6/2008 | Goodman | ............. B60T 8/1703 701/3 |
| 2008/0249675 | A1 * | 10/2008 | Goodman | ............. B64C 25/426 701/16 |
| 2009/0090816 | A1 * | 4/2009 | Gomes | .................... B64C 13/16 244/234 |
| 2014/0012437 | A1 * | 1/2014 | Jones | .................. G08G 5/0013 701/15 |
| 2014/0257603 | A1 * | 9/2014 | McKeown | ........... G08G 5/0021 701/16 |
| 2015/0012153 | A1 * | 1/2015 | Metzger, Jr. | ............. B60T 8/172 702/43 |
| 2015/0012201 | A1 * | 1/2015 | Metzger | ................ B64C 25/426 701/82 |
| 2017/0137144 | A1 * | 5/2017 | Georgin | ................ G08G 5/065 |
| 2017/0341772 | A1 | 11/2017 | Reis et al. | |
| 2019/0054906 | A1 * | 2/2019 | Pedapudi | ................ B64C 25/42 |
| 2019/0056740 | A1 * | 2/2019 | Westphal | ................ G05D 1/02 |
| 2019/0106089 | A1 | 4/2019 | Pandey | |
| 2019/0276160 | A1 * | 9/2019 | Kipersztok | ........... G05D 1/0661 |
| 2020/0013297 | A1 * | 1/2020 | Kanagarajan | ......... B60T 8/1703 |
| 2021/0276519 | A1 * | 9/2021 | Georgin | ................ B60T 8/171 |
| 2022/0058963 | A1 * | 2/2022 | Horne | .................... B64D 45/00 |
| 2023/0137045 | A1 * | 5/2023 | Maalioune | ............. B64C 19/00 701/3 |

\* cited by examiner

| Typical Values from Reference Handbook/Operating Manual/ Standard Procedures | | | | Calculated Values for RTO advisory and Automated RTO sequences | | |
|---|---|---|---|---|---|---|
| Reported Braking Action (Index) | Reported Runway Friction Coefficient (μ) | Reported Equivalent Runway Condition | Wheel Braking Coefficient (μBrakes) | RTO INITIATING POINT Distance | START AUTOMATED RTO SEQUENCE Distance | RTO Braking Sequences |
| Good (5) | > 0.40 | Dry or wet runway without risk of hydroplaning | Ground Speed Dependent per FAA DOT §25.109(c) | Derived from Runway Data, Aircraft Configuration Data, Aircraft Speed and Braking Data | Derived from Runway Data, Aircraft Configuration Data, Aircraft Speed and Braking Data | Derived from Runway data, Aircraft Configuration data and μBrakes |
| Good / Medium (4) | 0.36 to 0.39 | Dry or wet runway without risk of hydroplaning | 0.20 | Derived from Runway Data, Aircraft Configuration Data, Aircraft Speed and Braking Data | Derived from Runway Data, Aircraft Configuration Data, Aircraft Speed and Braking Data | Derived from Runway data, Aircraft Configuration data and μBrakes |
| Medium (3) | 0.30 to 0.35 | Runway covered with slush or dry Snow | 0.16 | Derived from Runway Data, Aircraft Configuration Data, Aircraft Speed and Braking Data | Derived from Runway Data, Aircraft Configuration Data, Aircraft Speed and Braking Data | Derived from Runway data, Aircraft Configuration data and μBrakes |
| Medium / Poor (2) | 0.26 to 0.29 | Runway covered with slush or dry Snow | 50% of §25.109(c) Max mB=0.16, min mB=0.05 | Derived from Runway Data, Aircraft Configuration Data, Aircraft Speed and Braking Data | Derived from Runway Data, Aircraft Configuration Data, Aircraft Speed and Braking Data | Derived from Runway data, Aircraft Configuration data and μBrakes |
| Poor (1) | 0.25 and below | Runway covered with dry snow or Runway covered with standing water, with risk of hydroplaning, or with wet snow. | 0.08 | Derived from Runway Data, Aircraft Configuration Data, Aircraft Speed and Braking Data | Derived from Runway Data, Aircraft Configuration Data, Aircraft Speed and Braking Data | Derived from Runway data, Aircraft Configuration data and μBrakes |
| Unreliable | Unreliable | Runway covered with standing water, with risk of hydroplaning, or with wet snow, Runway with high risk of hydroplaning. | | Derived from Runway Data, Aircraft Configuration Data, Aircraft Speed and Braking Data | Derived from Runway Data, Aircraft Configuration Data, Aircraft Speed and Braking Data | Derived from Runway data, Aircraft Configuration data and μBrakes |

REJECTED TAKEOFF AIRCRAFT SYSTEM AND METHOD

CROSS-REFERENCE TO RELATED APPLICATIONS

The present application is related to and claims priority from: Indian Application Serial Number 202041056065, titled REJECTED TAKEOFF AIRCRAFT SYSTEM AND METHOD, filed Dec. 23, 2020. Indian Application Serial Number 202041056065 is herein incorporated by reference in its entirety.

BACKGROUND

A rejected takeoff (RTO) decision and maneuver involves strict adherence to operational contingencies and handling techniques. Each takeoff includes a possibility of an RTO and a subsequent series of problems resulting from the actions taken during the RTO. A "go/no-go" decision should be made prior to reaching particular speed and runway length. The complexity may even become stressful for a pilot when the runway length is shorter, a runway condition is contaminated, and the airplane is at balanced-field maximum weight.

A pilot does not know when or if an RTO will occur. If the RTO is initiated after approaching for a maximum take-off speed and with limited remaining runway length, it may result in runway excursion.

Since it's not a normal approach to takeoff, experienced pilots evaluate and manually implement the following RTO actions, in a non-simultaneous sequential order over some duration of time: (a) apply maximum breaking and retards the throttles simultaneously; (b) bring the thrust leavers to idle; (c) raise the speed breaks; and (d) initiate reverse-thrust.

SUMMARY

In one aspect, embodiments of the inventive concepts disclosed herein are directed to a system. The system may include a processor installed in an aircraft. The processor may be configured to: obtain runway friction coefficient data and runway surface condition data for a runway; obtain braking coefficient data and braking action index data; obtain equivalent runway condition data and runway length data for the runway; obtain aircraft speed data of the aircraft and aircraft configuration data; based at least on the runway friction coefficient data, the runway surface condition data, the braking coefficient data, the braking action index data, the equivalent runway condition data, the aircraft speed data, and the aircraft configuration data, determine a rejected takeoff (RTO) initiating point (RIP) and a start automated RTO sequence point; and cause an automated RTO sequence to be performed if the start automated RTO sequence point is reached without the automated RTO sequence being manually overridden.

In a further aspect, embodiments of the inventive concepts disclosed herein are directed to a method. The method may include: obtaining, by a processor installed in an aircraft, runway friction coefficient data and runway surface condition data for a runway; obtaining, by the processor, braking coefficient data and braking action index data; obtaining, by the processor, equivalent runway condition data and runway length data for the runway; obtaining, by the processor, aircraft speed data of the aircraft and aircraft configuration data; based at least on the runway friction coefficient data, the runway surface condition data, the braking coefficient data, the braking action index data, the equivalent runway condition data, the aircraft speed data and the aircraft configuration data, determining, by the processor, a rejected takeoff (RTO) initiating point (RIP) and a start automated RTO sequence point; and causing, by the processor, an automated RTO sequence to be performed if the start automated RTO sequence point is reached without the automated RTO sequence being manually overridden.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4 is a view of an exemplary RTO lookup table of the system of FIGS. 1 and 2 according to the inventive concepts disclosed herein.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to determine a rejected takeoff (RTO) initiating point (RIP) and a start automated RTO sequence point and to cause an automated RTO sequence to be performed.

Some embodiments may provide advisories (e.g., visual and/or aural advisories) to a crew during takeoff for RTO and to automate the RTO manual sequences while considering runway length, aircraft weight, and takeoff speed. Some embodiments may automate the following RTO manual sequences to minimize pilot reaction time and to get the airplane into the full stopping configuration as quickly as possible and faster than can be done manually: (a) bring the elevator to null position; (b) initiate autobrake in aircraft wheels; (c) initiate thrust to idle; (d) initiate reverse-thrust; and (e) deploy the spoilers and flaps. Some or all of (a)-(e) may be performed simultaneously.

Some embodiments may be configured to automate RTO sequences by considering aircraft speed, aircraft configuration data, and remaining runway length by which an RTO must be initiated to assure a safe stop. Automated RTO sequences may eliminate inadequate use of stopping devices (e.g., brakes, thrust reversers, airbrakes, etc), and may reduce the stopping distance after an RTO to avoid overrun.

Figure 1:
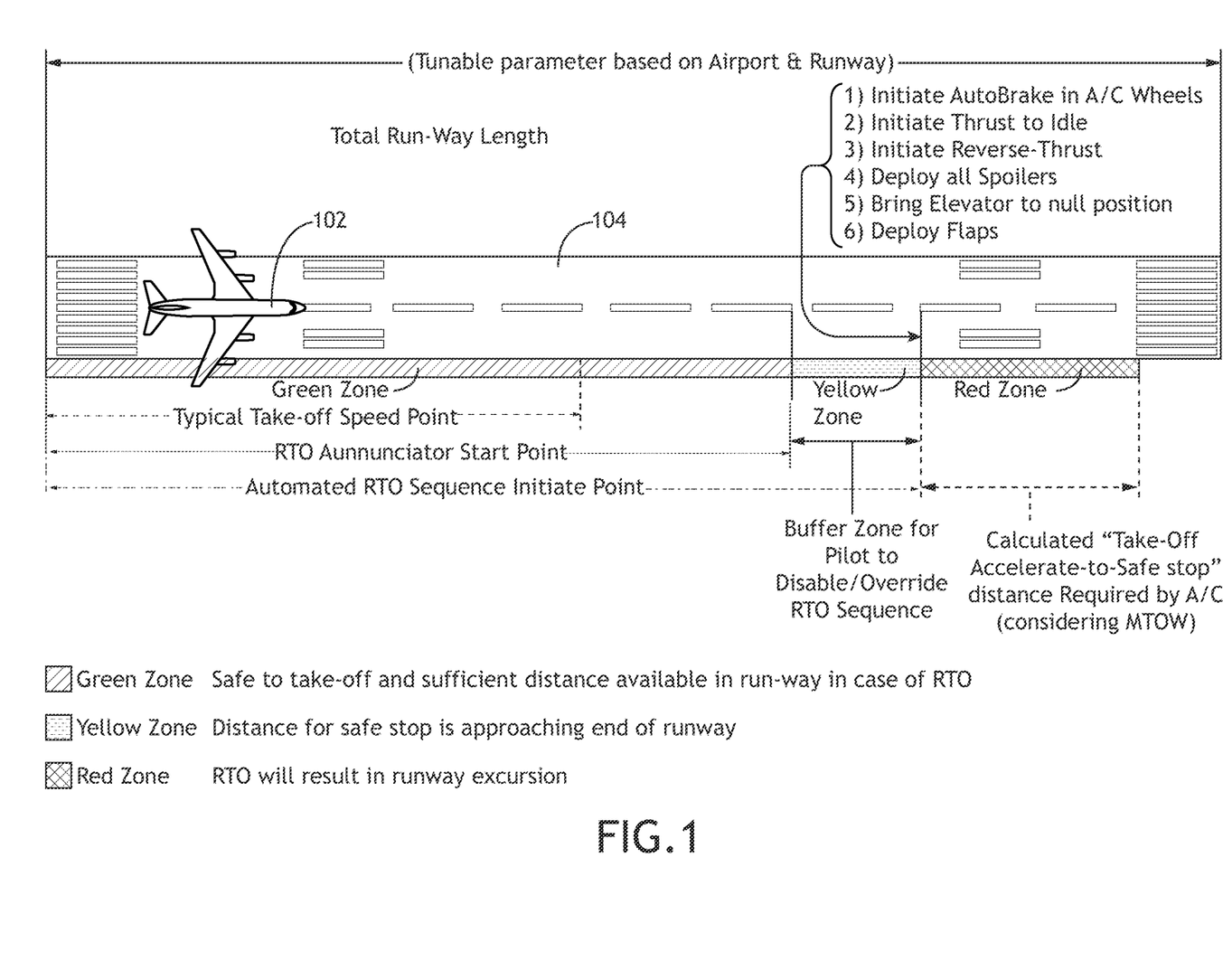
FIG. 1 is a view of an exemplary embodiment of a system according to the inventive concepts disclosed herein.

Referring now to FIG. 1, an exemplary embodiment of a system 100 including an aircraft 102 on a runway 104, associated with an exemplary mission scenario, according to the inventive concepts disclosed herein is depicted.

In some embodiments, onboard equipment may advise the crew to start the RTO process once an RIP (e.g., at start of yellow zone in FIG. 1) is reached and if the crew has not yet recognized. This alerts the crew to initiate an RTO automated sequence process. A visual and/or an aural advisory are provided to the crew to facilitate start of the RIP, and the crew may interface with a user interface system (e.g., a soft or hard switch) to initiate the automated RTO sequences. If there is no takeoff threat, crew may have to disable "Automated RTO sequences" before reaching the start automated RTO sequence point (start of red zone in FIG. 1). Automated RTO sequences will be initiated if crew does not disable "Automated RTO sequences" before reaching the start automated RTO sequence point. This embodiment is reflected in a flow diagram shown in FIG. 5, discussed in more detail below.

In some embodiments, onboard equipment may initiate an automated RTO Sequence when a start automated RTO sequence point is reached and the crew has enabled the initiate Automated RTO sequences. A visual and/or an aural indication may be provided to the crew to start the Automated RTO sequences. For example, a soft or hard switch may be provided to initiate Automated RTO sequences. RTO manual sequences may be automated in commands to various aircraft systems, such as the brake control systems, actuation control systems, and engine thrust reverse actuation systems, for a safe stop of the aircraft 102 during an RTO. This embodiment is reflected in a flow diagram shown in FIG. 6, discussed in more detail below.

Figure 2:
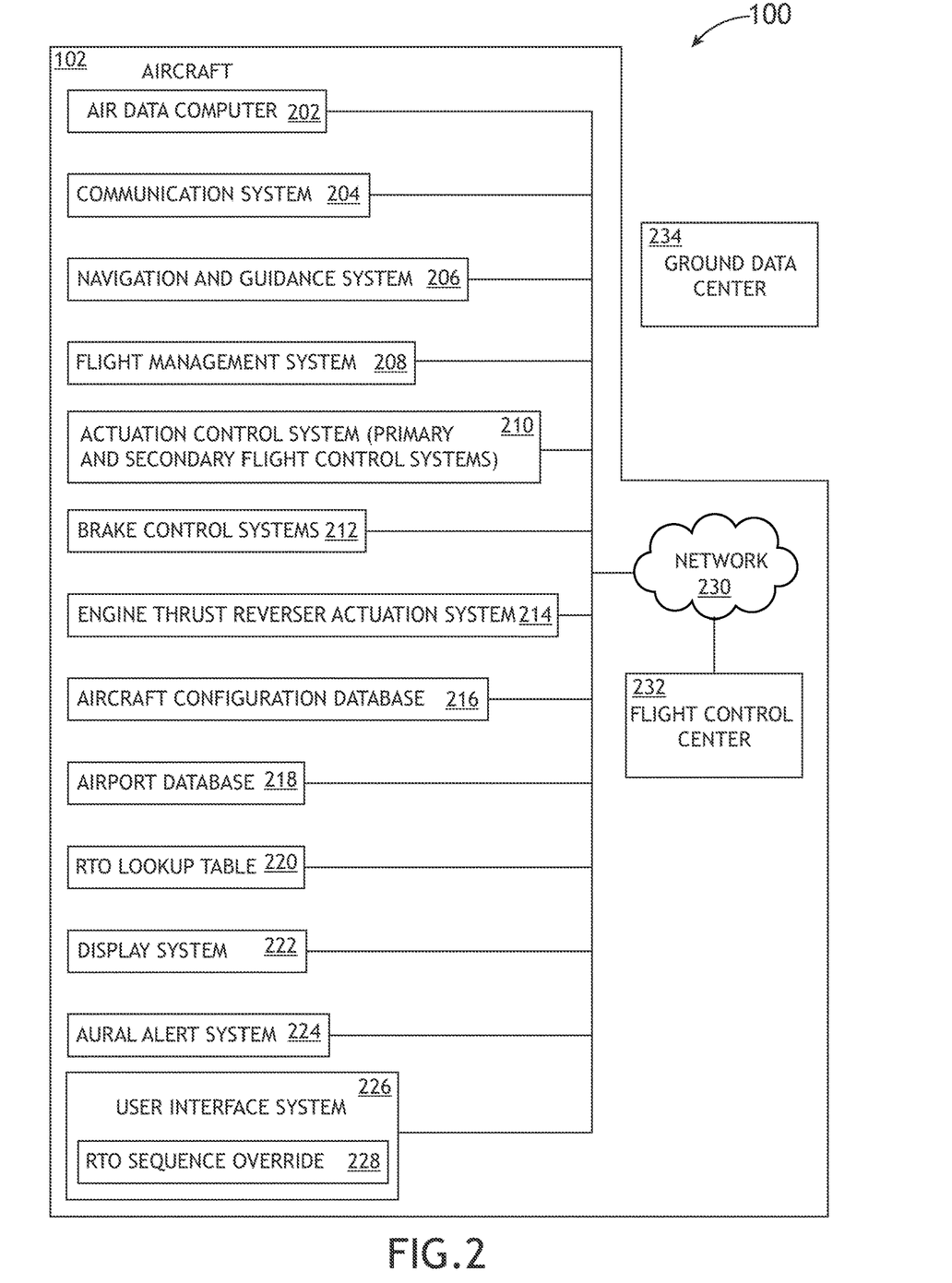
FIG. 2 is a further view of the system of FIG. 1 according to the inventive concepts disclosed herein.
Figure 3:
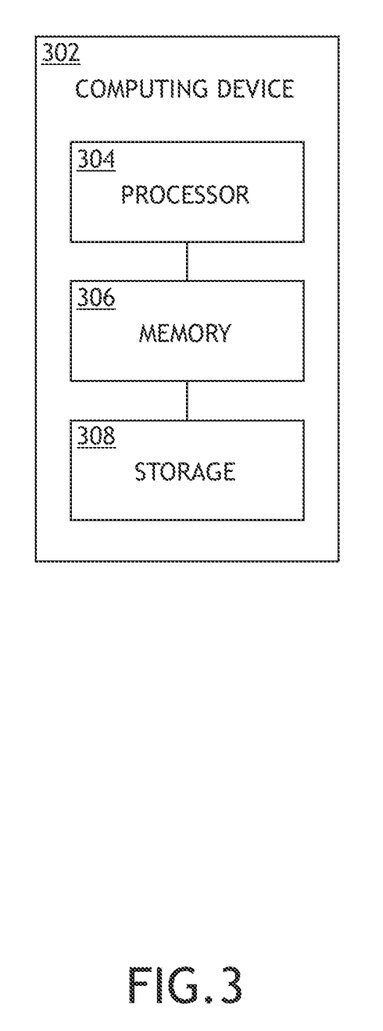
FIG. 3 is a view of an exemplary computing device of the system of FIGS. 1 and 2 according to the inventive concepts disclosed herein.

Referring now to FIGS. 2-4, an exemplary embodiment of the system 100 according to the inventive concepts disclosed herein is depicted. In some embodiments, the system may include at least one ground data center 234 and the aircraft 102, which may be communicatively coupled at any given time. The aircraft 102 may include at least one air data computer 202, at least one communication system 204, at least one navigation and guidance system 206, at least one flight management system (FMS) 208, at least one actuation control system 210 (e.g., a primary and/or secondary flight control system), at least one brake control system 212, at least one engine thrust reverser actuation system 214, at least one aircraft configuration database 216, at least one airport database 218, at least one RTO lookup table 220, at least one display system 222, at least one aural alert system 224, at least one user interface system 226 including an RTO sequence override 228, at least one flight control computer 232, some or all of which may be communicatively coupled (e.g., via at least one network 230) at any given time. In some embodiments, the at least one air data computer 202, the at least one communication system 204, the at least one navigation and guidance system 206, the at least one flight management system (FMS) 208, the at least one actuation control system 210 (e.g., a primary and/or secondary flight control system), the at least one brake control system 212, the at least one engine thrust reverser actuation system 214, the at least one aircraft configuration database 216, the at least one airport database 218, the at least one RTO lookup table 220, the at least one display system 222, the at least one aural alert system 224, the at least one user interface system 226 including an RTO sequence override 228, and/or the at least one flight control computer 232 may be implemented as a single computing device or any number of computing devices configured to perform (e.g., collectively perform if more than one computing device) any or all of the operations disclosed throughout.

In some embodiments, some, each, or all of the air data computer 202, the communication system 204, the navigation and guidance system 206, the flight management system (FMS) 208, the actuation control system 210 (e.g., a primary and/or secondary flight control system), the brake control system 212, the engine thrust reverser actuation system 214, the aircraft configuration database 216, the airport database 218, the RTO lookup table 220, the display system 222, the aural alert system 224, the user interface system 226 including an RTO sequence override 228, the flight control computer 232, and/or the ground data center 234 may be a computing device 302 (as shown in FIG. 3), may include at least one computing device 302, or may be implemented on the computing device 302. For example, each computing device 302 may include at least one processor 304, at least one memory 306, and/or at least one storage 308, some or all of which may be communicatively coupled at any given time. For example, the at least one processor 304 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform if more than one processor) any of the operations disclosed throughout. For example, the at least one processor 304 may include a CPU and a GPU configured to perform (e.g., collectively perform) any of the operations disclosed throughout. The processor 304 may be configured to run various software applications or computer code stored (e.g., maintained) in a non-transitory computer-readable medium (e.g., memory 306 and/or storage 308) and configured to execute various instructions or operations. The processor 304 of the computing device 302 may be configured to perform any or all of the operations disclosed throughout.

The air data computer 202 may provide necessary information for airspeed. For example, the air data computer 202 may output airspeed data of the aircraft 102 to any suitable computing device of the system 100, such as the flight control computer 232.

The communication system 204 may be a system capable of transmitting and/or receiving data. The communication system 204 may include any number and/or combination of transmitters, receivers, transceivers, radios, modems, and/or antennas. For example, the communication system 204 may be an aircraft communications addressing and reporting system (ACARS), a datalink, and/or an automatic dependent surveillance-broadcast (ADS-B) in/out system, etc. For example, the communication system 204 may output equivalent runway condition data, braking coefficient data, braking action index data, runway friction coefficient (μ) data, and/or wind aloft data received from the ground data center 234 to any suitable computing device of the system 100, such as the flight control computer 232.

The navigation and guidance system 206 may provide information on attitude, position, altitude, and/or guidance parameters that are required for aircraft navigation operations. For example, the navigation and guidance system 206 may output lateral heading deviation data, altitude data, and position data to any suitable computing device of the system 100, such as the flight control computer 232.

The flight management system (FMS) 208 may be capable of providing flight path data, guidance parameter executions, etc. For example, the FMS 208 may output data associated with a distance to runway threshold, ground track information, flight path angle (FPA), take-off zone over selected runway, and/or touchdown zone to any suitable computing device of the system 100, such as the flight control computer 232.

The actuation control system 210 may include the primary and/or secondary flight control systems used for speed-brake and safe deceleration. For example, the actuation control system 210 may receive a command from another computing device (e.g., the flight control computer 232) to control elevator, spoilers, and flaps to achieve safe stop of the aircraft 102 during an automated RTO sequence.

The brake control system 212 may contribute to safe deceleration and aircraft stability while braking. For example, the brake control system 212 may receive a command from another computing device (e.g., the flight control computer 232) to initiate auto brake in aircraft wheels for performing an automated RTO sequence.

The engine thrust reverser actuation system 214 may allow thrust from the engines to be used to slow the aircraft 102. For example, the engine thrust reverser actuation system 214 may receive a command from another computing device (e.g., the flight control computer 232) to initiate thrust to idle and initiate reverse thrust for performing an automated RTO sequence.

The aircraft configuration database 216 may be maintained in a computer readable medium (e.g., memory 306 and/or storage 308) of a computing device (e.g., 302). The aircraft configuration database 216 may contain data associated with the aircraft configuration, operational limitations, demonstrated limits (e.g., aircraft data, weight, speed, flight level, etc. of the aircraft 102). For example, the computing device maintaining the aircraft configuration database 216 may output data associated with speed and flight level to any suitable computing device of the system 100, such as the flight control computer 232.

The airport database 218 may be maintained in a computer readable medium (e.g., memory 306 and/or storage 308) of a computing device (e.g., 302). The airport database 218 may contain data associated with airport layouts and/or runway information (length, width, etc.). For example, the computing device maintaining the airport database 218 may output data associated with runway layout (e.g., length and/or shoulders), runway elevation, runway heading, and decision height to any suitable computing device of the system 100, such as the flight control computer 232.

The RTO lookup table 220 may be maintained in a computer readable medium (e.g., memory 306 and/or storage 308) of a computing device (e.g., 302). The RTO lookup table 220 contains information from standard operating limits, as well as calculated values generated for use in some embodiments, such as for determining a rejected takeoff (RTO) initiating point (RIP) and a start automated RTO sequence point, for RTO advisories, and for causing an automated RTO sequence to be performed. FIG. 4 shows an exemplary embodiment of an RTO lookup table 220. For example, the computing device maintaining the RTO lookup table 220 may receive data associated with an RIP, start automated RTO sequence point, primary flight controls, braking signals, and/or trust control from any suitable computing device of the system 100, such as the flight control computer 232. Additionally, for example, the computing device maintaining the RTO lookup table 220 may output data associated with an RIP, start automated RTO sequence point, primary flight controls, braking signals, and/or trust control to any suitable computing device of the system 100, such as the flight control computer 232. For example, the RTO lookup table 220 may be a computer readable medium where typical standard operating limits are captured and maintained. Some embodiments may include determining an RIP over a current ground track and displaying the information on the display system 222. In some embodiments, the RTO lookup table 220 may include commands for brake control systems 212, actuation control systems 210, and/or engine thrust reverser actuation systems 214 for aircraft deceleration and safe stop. The values maintained in the RTO lookup table 220 may be derived from current wheel braking coefficient prevailed over a selected Runway. The derived values may be stored in the RTO lookup table 220. For example, any suitable computing device of the system 100, such as the flight control computer 232, may access the RTO lookup table 220 to determine an RIP, a start automated RTO sequence point, and automated RTO braking sequences, which may in part based on lookup values and calculations.

As used throughout, reported braking action (Index) may mean an index value for runway condition description, wherein this value may describe the braking action for the runway.

As used throughout, reported runway friction coefficient ($\mu$) may mean a format of braking action declarations that are given using the coefficient of friction. The index value for assessing runway conditions may facilitate safe takeoff and landing decisions based on readings taken by a ground-friction measurement vehicle on the same runway.

As used throughout, reported equivalent runway condition may describe the condition and/or status of the runway.

As used throughout, wheel braking coefficient (pBrakes) may be an aircraft braking coefficient dependent upon the surface friction between the tires on the aircraft wheels and the pavement surface. Less friction results in less aircraft braking coefficient and less aircraft braking response.

The display system 222 may include any suitable display(s) (e.g., primary flight display (PFD), multi-function window display (MFD), head-up display (HUD), etc.) capable of displaying alerts and other parameters as generated by various embodiments. For example, display system 222 may receive data associated with alerts and/or warnings from any suitable computing device of the system 100, such as the flight control computer 232. For example, such alerts and/or warnings may be associated with an RIP and/or start automated RTO sequences over the current track. For example, such alerts and/or warnings may indicate that an automated RTO sequence will automatically initiate once the aircraft 102 reaches the start automated RTO sequence point unless the automated RTO sequence is manually overridden.

The aural alert system 224 may include any suitable audio device that can annunciate aural warnings and/or alerts generated by various embodiments. For example, the aural alert system 224 may include speaker(s) and/or headphone(s). For example, the aural alert system 224 may receive data associated with alerts and/or warnings from any suitable computing device of the system 100, such as the flight control computer 232. For example, such alerts and/or warnings may indicate that an automated RTO sequence will automatically initiate once the aircraft 102 reaches the start automated RTO sequence point unless the automated RTO sequence is manually overridden.

The user interface system 226 may including an RTO sequence override 228. The user interface system may be include any suitable user interface device(s), such as a touchscreen (e.g., of the display system 222 and/or another display unit, for example, which may include a soft button), a multipurpose control panel, a control panel integrated into a flight deck, a cursor control panel (CCP) (sometimes referred to as a display control panel (DCP)), a keyboard, a mouse, a trackpad, at least one hardware button, a switch, an eye tracking system, and/or a voice recognition system. The user interface 226 may be configured to receive at least one user input and to output the at least one user input to a computing device of the system 100. The RTO sequence override 228 may allow a user to override (e.g., disable) an automated RTO sequence.

The ground data center 234 may include ground-based devices and communication systems, such as air traffic control (ATC), automated weather monitoring and/or observation systems, automated terminal information transmission systems, and/or or other landed aircraft. For example, the ground data center 234 may output data associated with wind aloft data, runway condition, braking efficiency, braking action index, and/or runway friction coefficient ($\mu$) to any suitable computing device of the system 100, such as the flight control computer 232.

A particular computing device 302 (e.g., the flight control computer 232) may be configured to obtain any of various information and/or data of the other computing devices of the system 100 and to use some or all of such information and/or data to carry out an automated RTO sequence. For example, at least one processor 304 of the computing device 302 (e.g., installed in the aircraft 102) may be configured to: obtain runway friction coefficient data and runway surface condition data for a runway; obtain braking coefficient data and braking action index data; obtain equivalent runway condition data and runway length data for the runway; obtain aircraft speed data of the aircraft and aircraft configuration data; based at least on the runway friction coefficient data, the runway surface condition data, the braking coefficient data, the braking action index data, the equivalent runway condition data, the aircraft speed data, and the aircraft configuration data, determine a rejected takeoff (RTO) initiating point (RIP) and a start automated RTO sequence point; and/or cause an automated RTO sequence to be performed if the start automated RTO sequence point is reached without the automated RTO sequence being manually overridden.

For example, performance of the automated RTO sequence may include: bringing an elevator to a null position; initiating an autobrake in aircraft wheels; initiating thrust to idle; initiating reverse thrust; and/or deploying spoilers and flaps, some or all of which may be performed simultaneously. For example, bringing the elevator to the null position, initiating the autobrake in the aircraft wheels, and deploying the spoilers and the flaps may be performed simultaneously.

For example, when the aircraft is between the RIP and the start automated RTO sequence point, the at least one processor 304 of the particular computing device 302 (e.g., the flight control computer 232) may be further configured to output at least one of visual alerts or aural alerts indicating that an automated RTO sequence will automatically initiate once the aircraft 102 reaches the start automated RTO sequence point unless the automated RTO sequence is manually overridden. The display system 222 may be configured to display the visual alerts. The aural alert system 224 may be configured to present the aural alerts. In some embodiments, when the aircraft reaches the start automated RTO sequence point, the at least one processor 304 may be configured to initiate the automated RTO sequence. In some embodiments, the automated RTO sequence may be manually overridden allowing the aircraft to takeoff.

In some embodiments, the at least one processor 304 of the particular computing device 302 (e.g., the flight control computer 232) may be configured to receive a user input to initiate the automated RTO sequence prior to reaching the start automated RTO sequence point. In some embodiments, the at least one processor 304 of the particular computing device 302 (e.g., the flight control computer 232) may be configured to receive a user input to initiate the automated RTO sequence prior to reaching the RIP.

Figure 5:
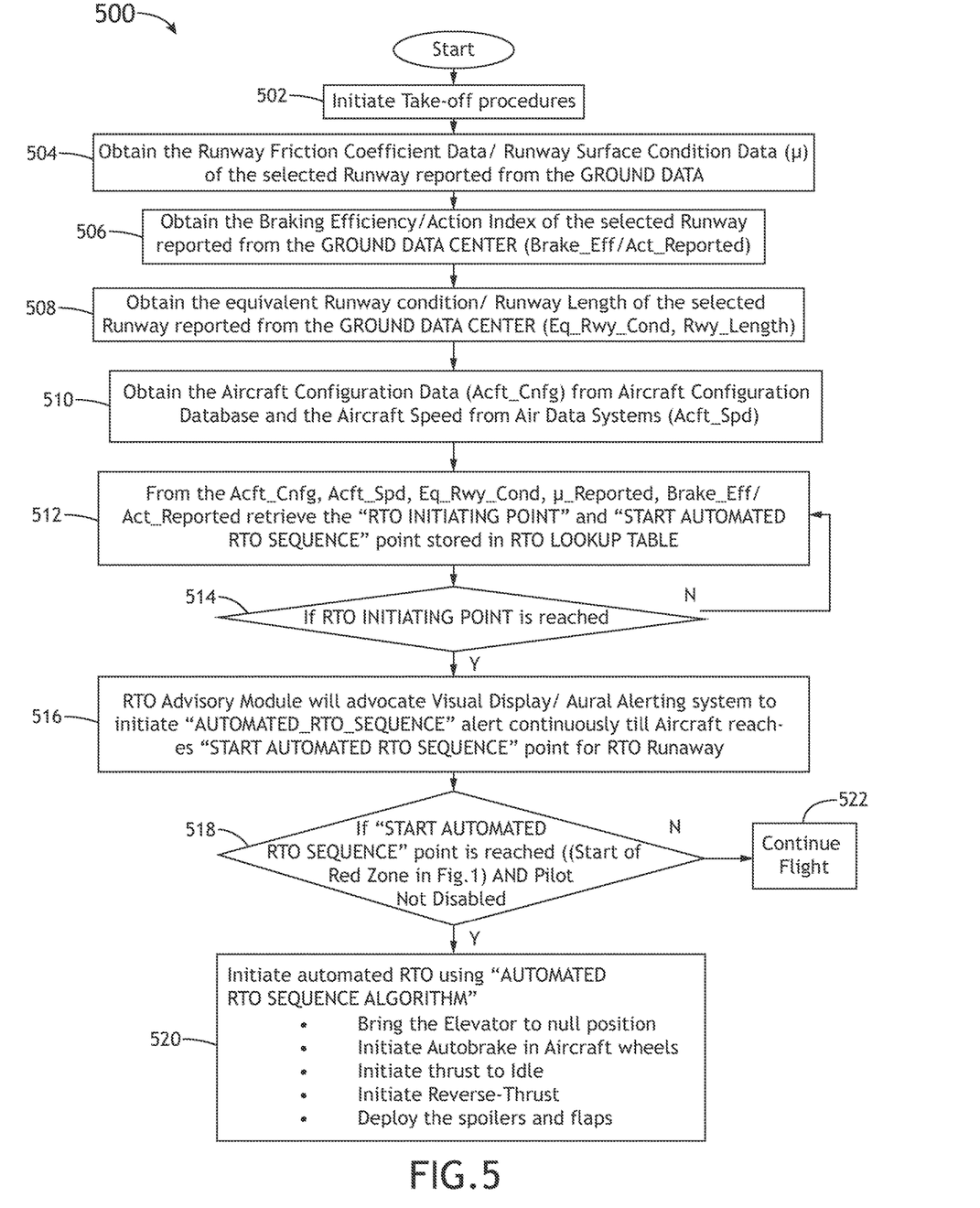
FIG. 5 is a diagram of an exemplary embodiment of a method according to the inventive concepts disclosed herein.

Referring now to FIG. 5, an exemplary embodiment of a method 500 according to the inventive concepts disclosed herein may include one or more of the following steps. Additionally, for example, some embodiments may include performing one or more instances of the method 500 iteratively, concurrently, and/or sequentially. Additionally, for example, at least some of the steps of the method 500 may be performed in parallel and/or concurrently. Additionally, in some embodiments, at least some of the steps of the method 500 may be performed non-sequentially.

A step 502 may include initiating take-off procedures.

A step 504 may include obtaining the Runway Friction Coefficient Data/Runway Surface Condition Data (μ) of the selected Runway reported from the GROUND DATA CENTER (μ_Reported).

A step 506 may include obtaining the Braking Efficiency/Action Index of the selected Runway reported from the GROUND DATA CENTER (Brake_Eff/Act_Reported).

A step 508 may include obtaining the equivalent Runway condition/Runway Length of the selected Runway reported from the GROUND DATA CENTER (Eq_Rwy_Cond, Rwy_Length).

A step 510 may include Obtaining Aircraft configuration data (Acft_Cnfg) from Aircraft configuration Database and obtaining the Aircraft Speed from Air Data Systems (Acft_Spd).

A step 512 may include, based at least on the Acft_Cnfg, Acft_Spd, Eq_Rwy_Cond, μ_Reported, Brake_Eff/Act_Reported, retrieving the "RTO INITIATING POINT" and "START AUTOMATED RTO SEQUENCE" point stored in the RTO LOOKUP TABLE.

A step 514 may include determining if the RTO INITIATING POINT is reached.

A step 516 may include RTO Advisory Module will advocate Visual Display/Aural Alerting system to initiate "AUTOMATED_RTO_SEQUENCE" alert continuously till Aircraft reaches "START AUTOMATED RTO SEQUENCE" point for RTO Runaway Threat.

A step 518 may include If "START AUTOMATED RTO SEQUENCE" point is reached (Start of Red Zone in FIG. 1) AND Pilot Not Disabled "AUTOMATED_RTO_SEQUENCE" Mode.

A step 520 may include initiating automated RTO sequence, including:

Bring the Elevator to null position, Initiate Autobrake in Aircraft wheels, Initiate thrust to Idle, Initiate Reverse-Thrust, and/or Deploy the spoilers and flaps.

A step 522 may include continuing flight if a pilot disables the automated RTO sequence.

Further, the method 500 may include any of the operations disclosed throughout.

Figure 6:
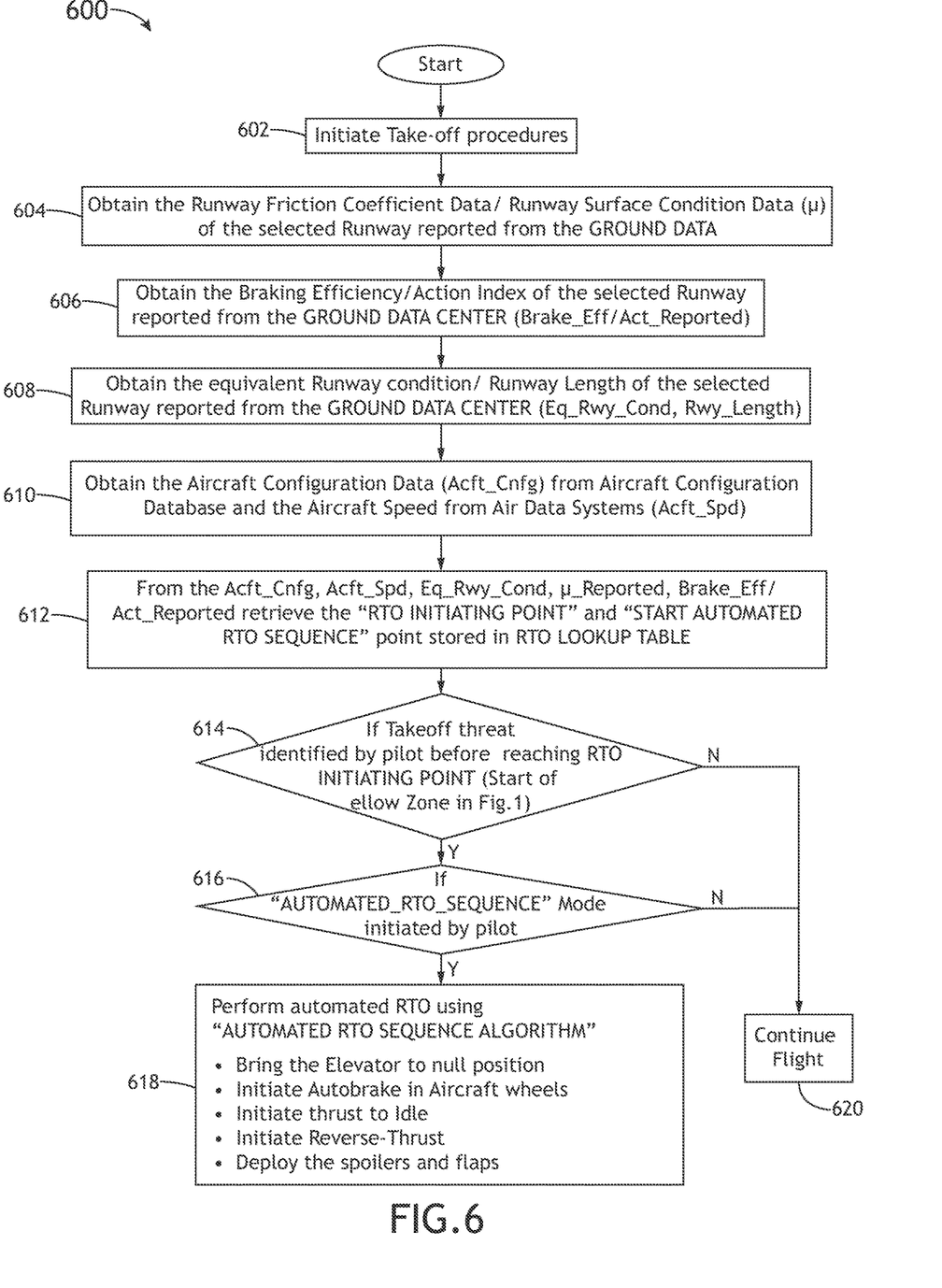
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include initiating take-off procedures.

A step 604 may include obtaining the Runway Friction Coefficient Data/Runway Surface Condition Data (μ) of the selected Runway reported from the GROUND DATA CENTER (μ_Reported).

A step 606 may include obtaining the Braking Efficiency/Action Index of the selected Runway reported from the GROUND DATA CENTER (Brake_Eff/Act_Reported).

A step 608 may include obtaining the equivalent Runway condition/Runway Length of the selected Runway reported from the GROUND DATA CENTER (Eq_Rwy_Cond, Rwy_Length).

A step 610 may include obtaining Aircraft configuration data (Acft_Cnfg) from Aircraft Configuration Database and obtaining the Aircraft Speed from Air Data Systems (Acft_Spd).

A step 612 may include, based at least on the Acft_Cnfg, Acft_Spd, Eq_Rwy_Cond, μ_Reported, Brake_Eff/Act_Reported, retrieving the "RTO INITIATING POINT" and "START AUTOMATED RTO SEQUENCE" point stored in the RTO LOOKUP TABLE.

A step 614 may include determining if Takeoff threat identified by pilot before reaching RTO INITIATING POINT.

A step 616 may include determining if "AUTOMATED_RTO_SEQUENCE" Mode initiated by pilot.

A step 618 may include initiating automated RTO sequence, including: Bring the Elevator to null position, Initiate Autobrake in Aircraft wheels, Initiate thrust to Idle, Initiate Reverse-Thrust, and/or Deploy the spoilers and flaps.

A step 620 may include continuing flight if a pilot disables the automated RTO sequence.

Further, the method 600 may include any of the operations disclosed throughout.

Figure 7:
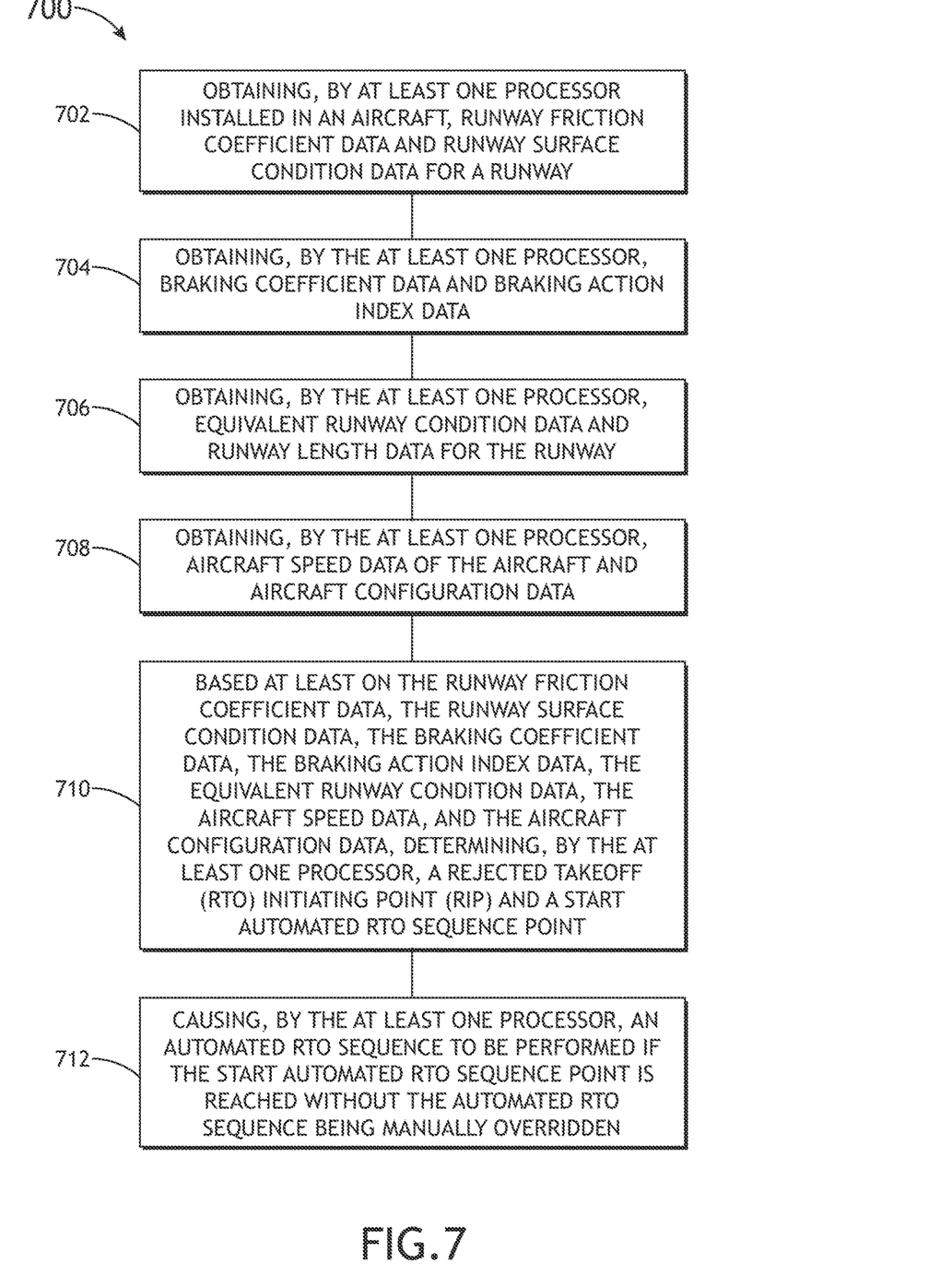
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include obtaining, by at least one processor installed in an aircraft, runway friction coefficient data and runway surface condition data for a runway.

A step 704 may include obtaining, by the at least one processor, braking coefficient data and braking action index data.

A step 706 may include obtaining, by the at least one processor, equivalent runway condition data and runway length data for the runway.

A step 708 may include obtaining, by the at least one processor, aircraft speed data of the aircraft and aircraft configuration data.

A step 710 may include, based at least on the runway friction coefficient data, the runway surface condition data, the braking coefficient data, the braking action index data, the equivalent runway condition data, the aircraft speed data, and the aircraft configuration data, determining, by the at least one processor, a rejected takeoff (RTO) initiating point (RIP) and a start automated RTO sequence point.

A step 712 may include causing, by the at least one processor, an automated RTO sequence to be performed if the start automated RTO sequence point is reached without the automated RTO sequence being manually overridden.

Further, the method 700 may include any of the operations disclosed throughout.

As will be appreciated from the above, embodiments of the inventive concepts disclosed herein may be directed to a system and a method configured to determine a rejected takeoff (RTO) initiating point (RIP) and a start automated RTO sequence point and to cause an automated RTO sequence to be performed.

As used throughout and as would be appreciated by those skilled in the art, "at least one non-transitory computer-readable medium" may refer to as at least one non-transitory computer-readable medium (e.g., memory 306, and/or storage 308; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a display system; and
at least one processor installed in an aircraft, the at least one processor configured to:
    obtain runway friction coefficient data for a runway, wherein the runway friction coefficient data includes information of a reported runway friction coefficient of the runway as reported by a ground vehicle experiencing runway surface conditions on the runway;
    obtain braking coefficient data and braking action index data, wherein the braking coefficient data includes information of a wheel braking coefficient, the wheel braking coefficient being an aircraft braking coefficient dependent upon a surface friction between aircraft tires on aircraft wheels and on a surface of the runway, wherein the braking action index data includes information of at least one braking action declaration, the at least one braking action declaration based at least on the wheel braking coefficient;
    obtain equivalent runway condition data and runway length data for the runway, wherein the equivalent runway condition data includes information of a description of a reported runway condition;
    obtain aircraft speed data of the aircraft and aircraft configuration data;
    based at least on the runway friction coefficient data, the braking coefficient data, the braking action index data, the equivalent runway condition data, the aircraft speed data, and the aircraft configuration data, determine a current ground track, a rejected takeoff (RTO) initiating point (RIP), a start automated RTO sequence point, and a buffer zone spanning a portion of the runway between the RIP and the start automated RTO sequence point to allow for a manual RTO sequence override input before the aircraft reaches the start automated RTO sequence point at the end of the buffer zone;
    cause an automated RTO sequence to be performed when the start automated RTO sequence point is reached without the automated RTO sequence being manually overridden, wherein performance of the automated RTO sequence includes: bringing an elevator to a null position; initiating an autobrake in aircraft wheels; initiating thrust to idle; initiating reverse thrust; and deploying spoilers and flaps; and
    when the aircraft is in the buffer zone between the RIP and the start automated RTO sequence point, the at least one processor is further configured to output at least one of visual alerts or aural alerts indicating that an automated RTO sequence will automatically initiate once the aircraft reaches the start automated RTO sequence point unless the automated RTO sequence is manually overridden, wherein one or more of the at least one of visual alerts or aural alerts are associated with the RIP and/or start automated RTO sequence over the current ground track, wherein the at least one of visual alerts or aural alerts includes at least one visual alert;
wherein the display system is configured to display the at least one visual alert and the RIP over the current ground track.

2. The system of claim 1, wherein bringing the elevator to the null position, initiating the autobrake in the aircraft wheels, and deploying the spoilers and the flaps are performed simultaneously.

3. The system of claim 1, further comprising an aural alert system configured to present the aural alerts.

4. The system of claim 1, wherein when the aircraft reaches the start automated RTO sequence point, the at least one processor is configured to initiate the automated RTO sequence.

5. A method, comprising:
obtaining, by at least one processor installed in an aircraft, runway friction coefficient data for a runway, wherein the runway friction coefficient data includes information of a reported runway friction coefficient of the runway as reported by a ground vehicle experiencing runway surface conditions on the runway;
obtaining, by the at least one processor, braking coefficient data and braking action index data, wherein the braking coefficient data includes information of a wheel braking coefficient, the wheel braking coefficient being an aircraft braking coefficient dependent upon a surface friction between aircraft tires on aircraft wheels and on a surface of the runway, wherein the braking action index data includes information of at least one braking action declaration, the at least one braking action declaration based at least on the wheel braking coefficient;
obtaining, by the at least one processor, equivalent runway condition data and runway length data for the runway, wherein the equivalent runway condition data includes information of a description of a reported runway condition;
obtaining, by the at least one processor, aircraft speed data of the aircraft and aircraft configuration data;
based at least on the runway friction coefficient data, the braking coefficient data, the braking action index data, the equivalent runway condition data, the aircraft speed data, and the aircraft configuration data, determining, by the at least one processor, a current ground track, a rejected takeoff (RTO) initiating point (RIP), a start automated RTO sequence point, and a buffer zone spanning a portion of the runway between the RIP and the start automated RTO sequence point to allow for a manual RTO sequence override input before the aircraft reaches the start automated RTO sequence point at the end of the buffer zone;
causing, by the at least one processor, an automated RTO sequence to be performed when the start automated RTO sequence point is reached without the automated RTO sequence being manually overridden, wherein performance of the automated RTO sequence includes: bringing an elevator to a null position; initiating an autobrake in aircraft wheels; initiating thrust to idle; initiating reverse thrust; and deploying spoilers and flaps;
when the aircraft is in the buffer zone between the RIP and the start automated RTO sequence point, outputting, by the at least one processor, at least one of visual alerts or aural alerts indicating that an automated RTO sequence will automatically initiate once the aircraft reaches the start automated RTO sequence point unless the automated RTO sequence is manually overridden, wherein one or more of the at least one of visual alerts or aural alerts are associated with the RIP and/or start automated RTO sequence over the current ground track, wherein the at least one of visual alerts or aural alerts includes at least one visual alert; and
displaying, by a display system, the at least one visual alert and the RIP over the current ground track.

6. The method of claim 5, wherein when the aircraft reaches the start automated RTO sequence point, the method further comprising initiating, by the at least one processor, the automated RTO sequence.

\* \* \* \* \*